United States Patent [19]

Takagi

[11] Patent Number: 5,091,866
[45] Date of Patent: Feb. 25, 1992

[54] INFORMATION PROCESSING APPARATUS DISPLAYING MULTIPLE WINDOWS AND DISTINGUISHING INDICIA

[75] Inventor: Shiro Takagi, Yokohama, Japan

[73] Assignee: Kabushiki Kaisha Toshiba, Kawasaki, Japan

[21] Appl. No.: 489,724

[22] Filed: Mar. 2, 1990

Related U.S. Application Data

[63] Continuation of Ser. No. 136,391, Dec. 22, 1987, abandoned.

[30] Foreign Application Priority Data

Dec. 26, 1986 [JP] Japan .................................. 61-315332

[51] Int. Cl.⁵ .......................................... G06F 15/62
[52] U.S. Cl. .................................... 395/158; 395/157
[58] Field of Search .............. 364/518, 521; 340/707, 340/710, 716, 721, 723; 382/44–48

[56] References Cited

U.S. PATENT DOCUMENTS

| | | | |
|---|---|---|---|
| 4,651,146 | 3/1987 | Lucash et al. ..................... | 340/721 |
| 4,653,020 | 3/1987 | Cheselka et al. ................... | 364/900 |
| 4,661,810 | 4/1987 | Himelstein et al. ............ | 340/710 X |
| 4,683,468 | 7/1987 | Himelstein et al. ............ | 340/710 X |
| 4,710,767 | 12/1987 | Sciacero et al. .................... | 340/799 |
| 4,769,762 | 9/1988 | Tsujido ............................. | 340/716 X |
| 4,772,882 | 9/1988 | Mical ................................ | 340/710 X |
| 4,806,919 | 2/1989 | Nakayama et al. ................ | 340/721 |
| 4,819,189 | 4/1989 | Kikuchi et al. ..................... | 364/521 |
| 4,829,294 | 5/1989 | Iwami et al. ..................... | 364/521 X |
| 4,833,596 | 5/1989 | Buckland et al. ............... | 364/521 X |
| 4,890,098 | 12/1989 | Dawes et al. ....................... | 340/721 |
| 4,890,257 | 12/1989 | Anthias et al. ..................... | 364/900 |

*Primary Examiner*—Heather R. Herndon
*Attorney, Agent, or Firm*—Finnegan, Henderson, Farabow, Garrett, and Dunner

[57] ABSTRACT

A display unit displays data to be processed. The display unit is capable of displaying a plurality of windows for displaying the data therein. A controller outputs the control data to display the plurality of windows and an indicia on the display unit. An operating unit supplies the controller with a position signal to move the indicia to a desired location. An area unit checks whether the indicia is located a predetermined window area of the windows being displayed on the display unit, any data displayed in the predetermined window area being processed prior to the data displayed in any other window area. A specifying unit supplies signals to the controller, the signals specifying, in accordance with the check results made by said area check unit, a condition in which the indicia is displayed to demonstrate whether the indicia is being displayed in the predetermined window area or in the other window areas.

11 Claims, 8 Drawing Sheets

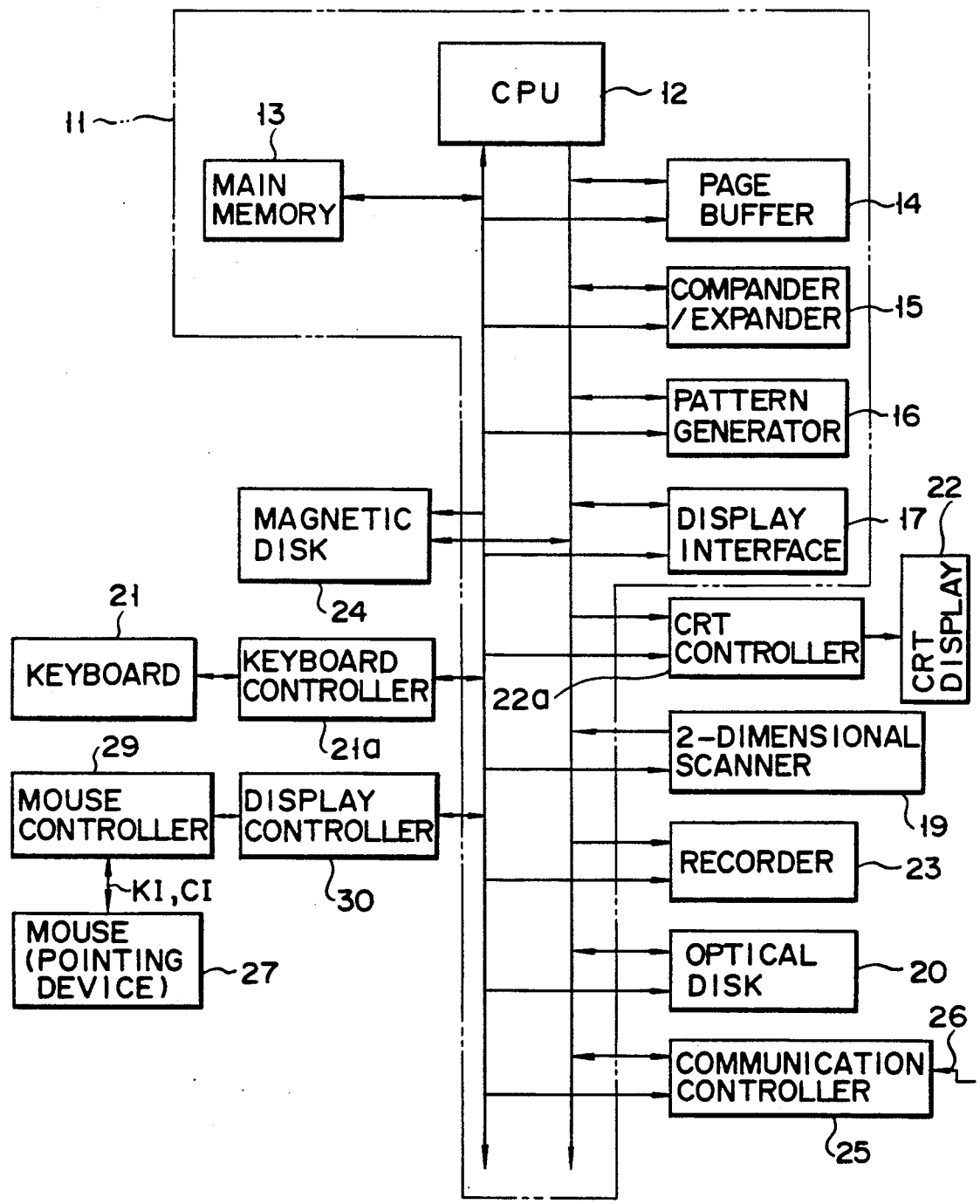
F I G. 1

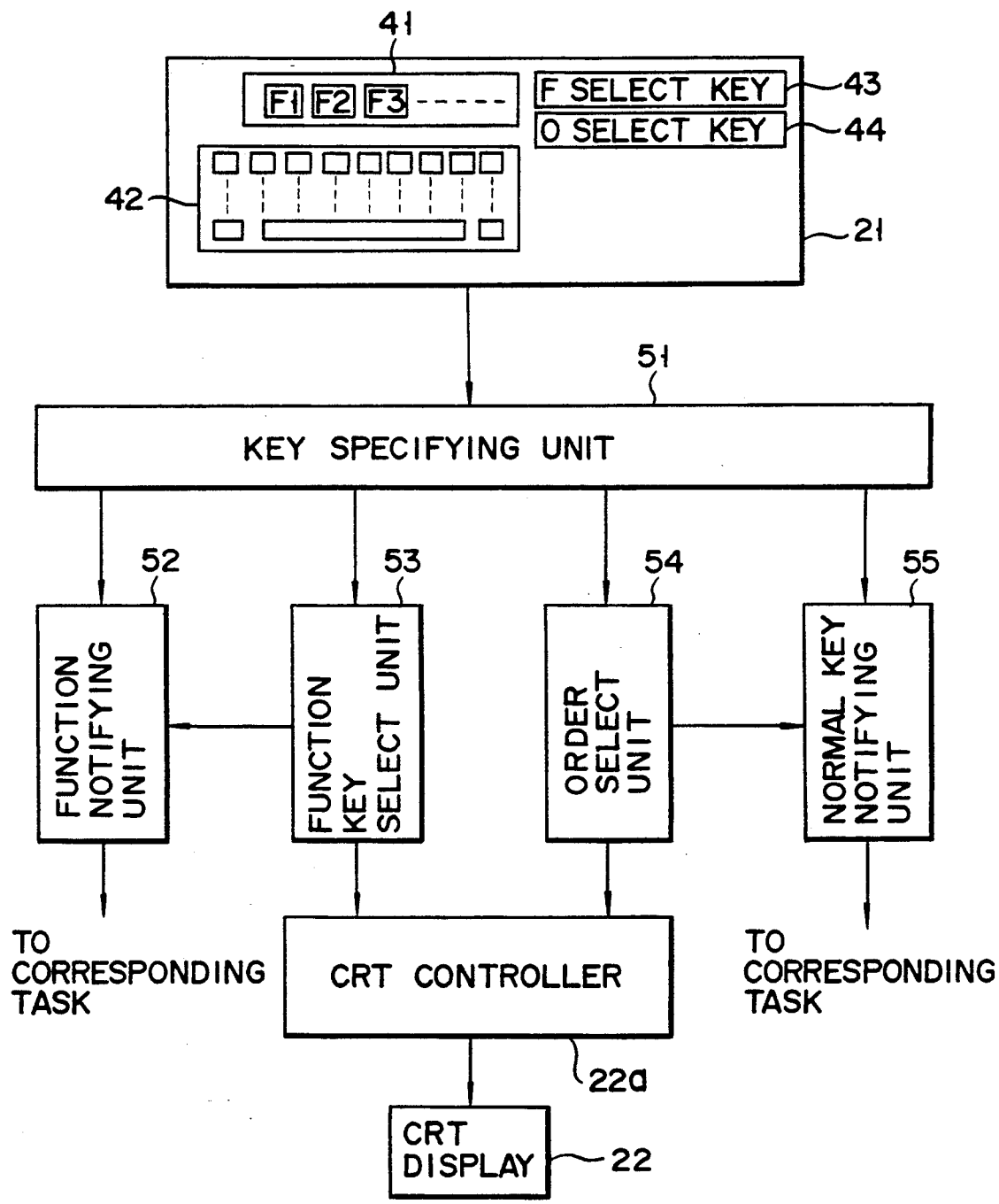
F I G. 5

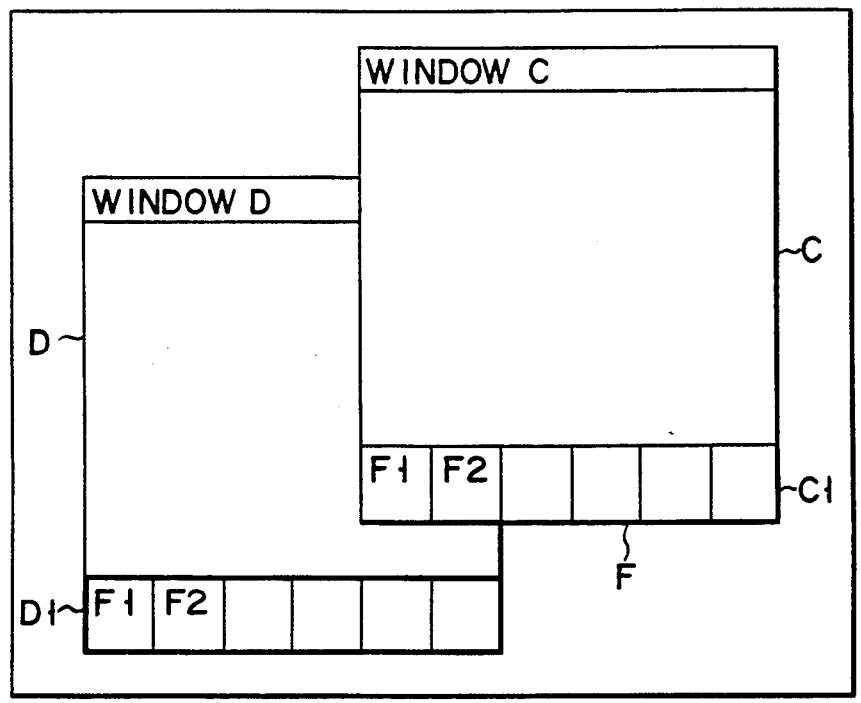
F I G. 6A
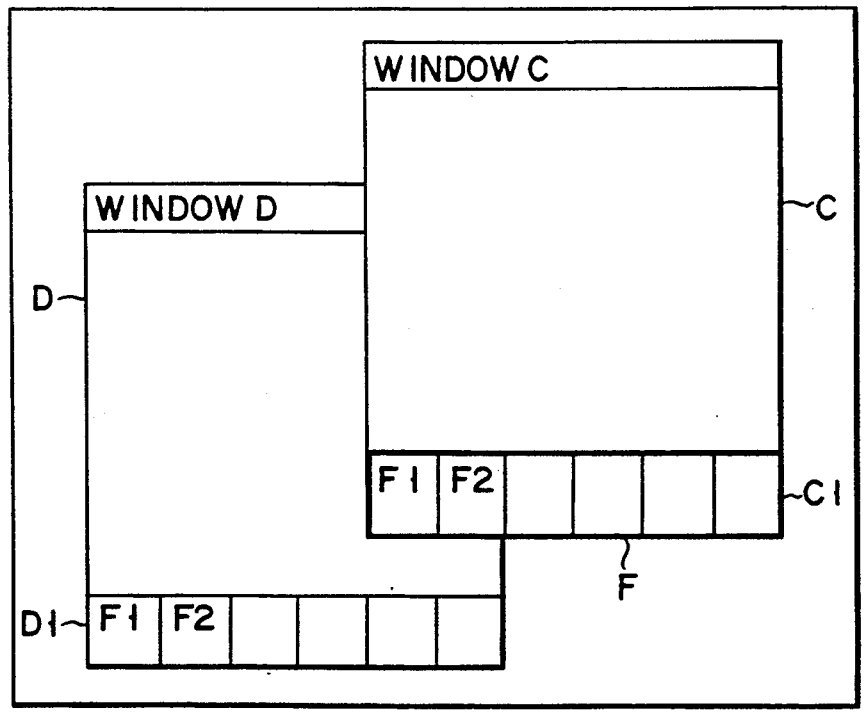
F I G. 6B

INFORMATION PROCESSING APPARATUS DISPLAYING MULTIPLE WINDOWS AND DISTINGUISHING INDICIA

This application is a continuation, of application Ser. No. 07/136,391, filed Dec. 22, 1987, now abandoned.

BACKGROUND OF THE INVENTION

This invention relates to an information processing apparatus and, more particularly, to a multi-window display controlling device of a data processor for controlling various types of operations by means of a cursor, which is moved by a pointer device such as a mouse.

Information processing apparatuses having a multi-task/multi-window system are well-known. In such an apparatus, a cursor is displayed on a CRT screen, for example, and is moved to a predetermined location on the screen by means of a pointing device such as a mouse, to designate a desired processing operation.

In the information processing apparatus, if the cursor is moved to a specific area on the CRT screen, the shape of the cursor is changed to show the operator the command that will be executed when the mouse is operated. For example, when a line is typed and echoed onto the screen, the cursor is shaped like a "pen." To move a displayed object, the cursor is shaped like a "pincette."

Indicating a command by an exact shape at the specific cursor location makes it easy for an operator to understand the operation performed by the command.

In such a multi-task/multi-window apparatus, a plurality of windows are displayed on one screen of the CRT display and tasks corresponding to those windows are executed concurrently. If the cursor shape is changed every time the cursor is moved to a specific location in each window in such a multi-task/multi-window data processing apparatus, the operator is often confused.

In this type of data processing apparatus, windows frequently partially overlap. If the cursor shape is changed when the cursor is below an overlapping window, the changed shape of the cursor does not present any effective information to the operator because the cursor is in the limited part of the window not being displayed. Additionally, every time the cursor is moved on the CRT screen, the system must determine the position of the cursor relative to the various to the various window regions resulting in increased response time for the system.

SUMMARY OF THE INVENTION

It is an object of the present invention to provide a new and improved information processing apparatus in which the operation is smooth even when an indicia, such as the cursor, is moved on the multi-window display, and the response time of the indicator is reduced.

According to the present invention, there is provided an information processing apparatus comprising:

means for displaying a plurality of window areas, each of which includes information to be processed, wherein a window area at least partially overlapped and hidden by others of the plurality of windows defines a hidden window area, means for determining a window area which is not a hidden window area, and means for displaying a distinguishing indicia in the window area determined not to be a hidden window area.

BRIEF DESCRIPTION OF THE DRAWINGS

These and other objects and features of the present invention can be understood through the following embodiment by reference to the accompanying drawings, in which:

FIG. 1 shows a block diagram of an information processing apparatus according a first preferred embodiment of this invention;

FIG. 5 shows a diagram illustrating a keyboard and its related circuit;

FIGS. 6A and 6B show displays explaining the operation of the circuit of FIG. 5;

DETAILED DESCRIPTION OF THE PREFERRED EMBODIMENTS

Figure 2:
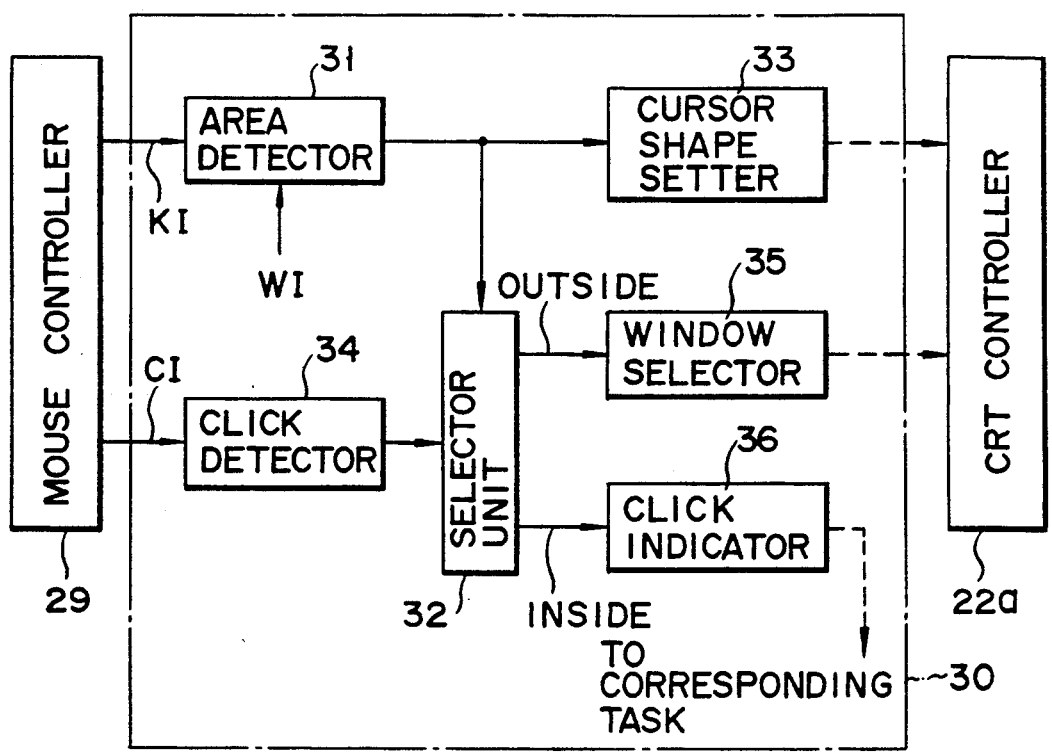
FIG. 2 shows a block diagram of a display control section in the FIG. 1 circuit.

A preferred embodiment of this invention will be described referring to the accompanying drawings.

FIG. 1 shows the construction of an information processing apparatus. Main controller 11 comprises CPU 12, main memory 13, page buffer 14, compander-/expander 15, pattern generator 16, and display interface 17, as shown in FIG. 1. CPU 12 is operable in a multi-task mode for executing various types of operations. Main memory 13 stores a control program, for example. Page buffer 14 has a memory capacity of 512 kilo bytes (=128 blocks), for example. Compander/expander 15 compresses and expands the image data. As is known, data compression reduces data redundancy and data expansion restores the original redundancy of the data. Pattern generator 16 stores the data in patterns comprised of characters and symbols.

Two dimensional scanner 19 scans an image on a document by laser beams, for example, and produces electrical signals representing the image data read in. Optical disk 20 sequentially stores the image data, which is supplied from two dimensional scanner 19 through main controller 11.

Keyboard 21 is used for entering the retrieval data relating to the image data and various types of operation commands. The output signal of keyboard 21 is supplied to CPU 12 via keyboard controller 21a.

A cathode ray tube display device 22 (referred to as a CRT display) displays the image data, which is collected by two dimensional scanning device 19 and supplied to CRT display 22 through main controller 11. CRT display 22 also displays the image data, which is read out from optical disk 20 and supplied to CRT display 22 through main controller 11. CRT display device 22 is controlled by CRT controller 22a. CRT controller 22a controls the display of multi-windows and the display of the cursor moved by a pointing device.

Recorder 23 is a printer, for example, and prints the image data, which is collected by two dimensional scanning device 19 and supplied thereto through main controller 11, or the image data, which is read out from optical disk 20 and supplied thereto through main controller 11.

Magnetic disk 24 stores a table of titles (also called retrieval data), which are respectively assigned to the image data.

Communication controller 25 is coupled with an external device via communication line 26, and transmits an image retrieval request signal and the retrieval data, for example, and receives an image retrieval request signal and the retrieval data, and supplies them to main controller 11.

Mouse 27 is a kind of pointing device. Mouse 27 is connected to mouse controller 29. Mouse controller 29 outputs a position signal KI as an indicia of CRT display 22, and operation signal CI indicative of an operation state of click button 28. These signals output from mouse controller 28 are supplied to display controller 30.

FIG. 2 shows a block diagram of display controller 30. The cursor position signal KI output from mouse controller 29, together with a window position signal WI supplied from CPU 12, is supplied to area detector 31. This area detector 31 detects the cursor movement into or out of the area of the window currently located at the frontmost position on the screen (referred to as the top), on the basis of the input cursor position signal KI and the window position signal WI. This detected output signal is supplied to selector unit 32 and cursor shape setter 33. Cursor shape setter 33 sets the shape of cursor to a standard shape when the detected output signal from area detector 31 represents cursor movement out of the window. When the cursor moves into the window, cursor shape setter 33 sets the unique or distinguishing cursor shape corresponding to that of the window currently located at the top, or frontmost position. The output signal of cursor shape setter 33 is supplied to CRT controller 22a. Operation signal CI output from the mouse controller 9 is supplied to click detector 34. Click detector 34 detects a transient state of the input operation signal when it changes from an off-state to an on-state. The detected signal is supplied to selector 32. Selector 32 sends a signal to window selector 35 when the cursor is located outside the top window. In response to this signal, window selector 35 outputs a select request signal to CRT controller 22a. The select request signal requests the CRT controller to move the window currently indicated by the cursor to the top. If selector 32 decides that the cursor is present in the top window, click indicator 36 notifies the task corresponding to the top window of the cursor position data.

The operation of the data processing apparatus thus arranged will now be described.

Figure 3:
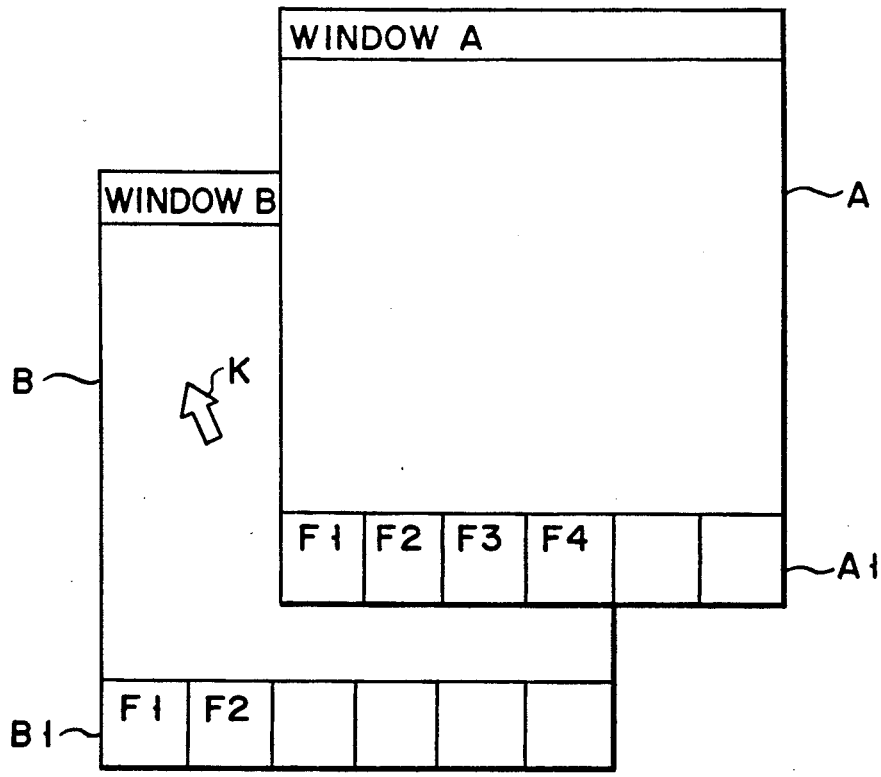
FIG. 3 shows an example of display where two windows are displayed partially overlapping.

FIG. 3 shows an example of display by CRT display 22. As shown, CRT display 22 displays two windows A and B overlapping with each other and also displays cursor K. These windows A and B respectively contain function areas A1 and B1 each containing commands corresponding to the function keys. In this display, some items of image data are retrieved from optical disk device 20, using a function key in the window A, and the retrieved data is displayed in window B. In this case, to sequentially display a plurality of retrieved image data in window B, function key 1 or 2 is operated for window A. Function key 1 directs the display of the image data next to the image data currently displayed in window B. Function key 2 directs the display of the previous image data. When function key 1 is operated in window A, the enlargement processing of the image data displayed in window A is executed.

Figure 4A:
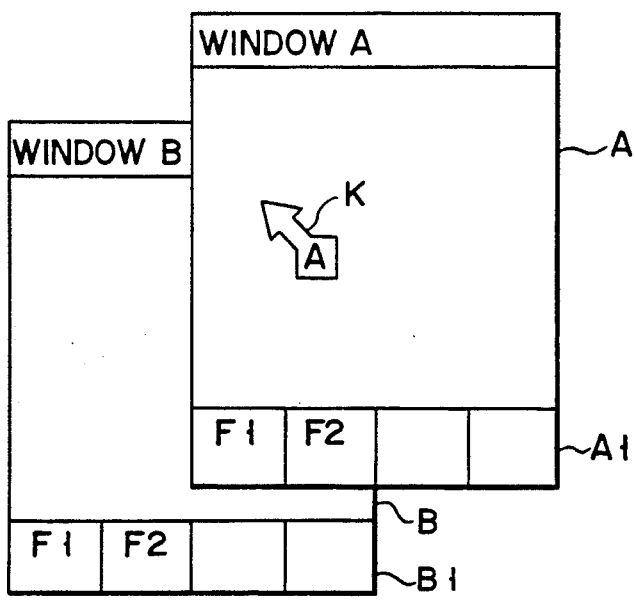
FIGS. 4A to 4C show an example of a display further explaining the display operation of FIG. 3.
Figure 4B:
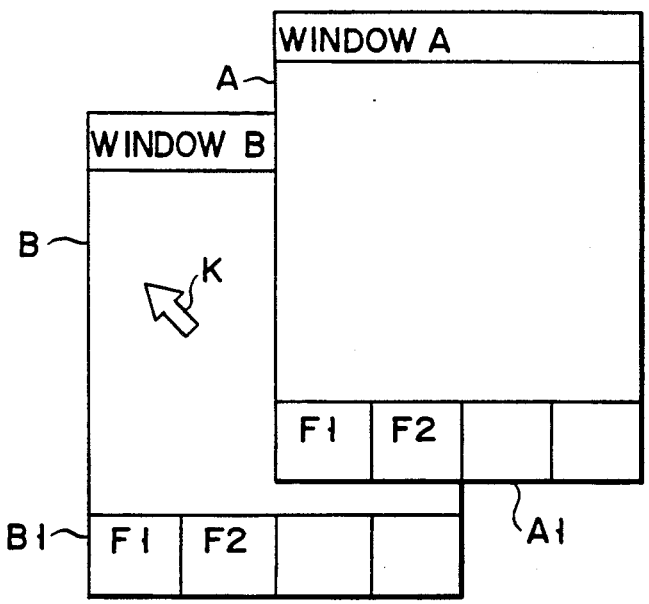
Figure 4C:
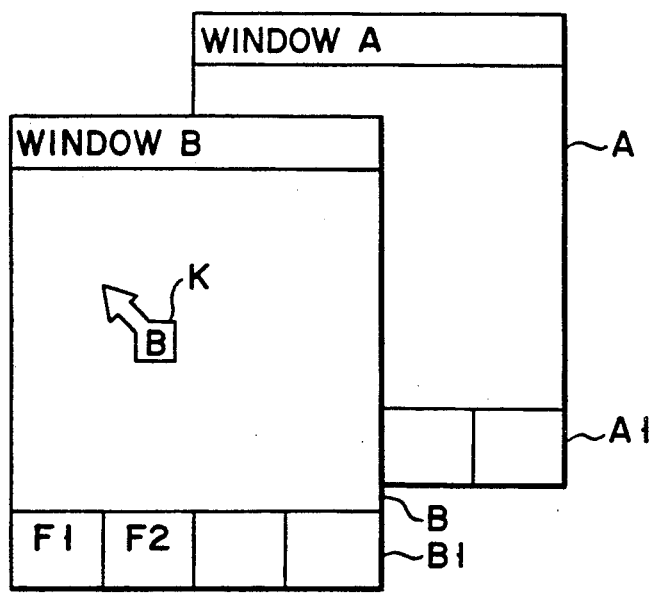

As described above, when cursor K is located in the area of windows other than the top window, the shape of cursor K is set to the standard shape. Under this condition, if mouse 27 is operated and cursor K is moved to the area of the top window A, cursor K is changed to the shape in window A as shown in FIG. 4(A). As shown, the cursor contains character "A". Under this condition, mouse 27 is operated, and cursor K is moved form the area of window A to that of window B. The shape of cursor K is changed to the standard shape again. In this display state, if click button 28 of mouse 27 is operated, windows A and B are interchanged, as shown in FIG. 4(c), with window B becoming the top window. Under this display state, if cursor K is in the area of window B, cursor K is changed into the shape of window B.

As shown in FIGS. 4A and 4C, when cursor K is moved to the top window A or window B, the click button 28 of mouse 27 is operated and the position data of cursor K is sent to the task corresponding to the top window, and a predetermined process is executed.

According to this embodiment, when the cursor is in the top window, its shape is changed to the shape in the top window. When the cursor is moved to other windows than the top window, the shape of cursor is changed into the standard shape. Therefore, the operator can easily understand to which window the cursor corresponds, and the operator's recognition tasks are made easier.

In moving the cursor it is necessary to check only whether the cursor is in the top window. This fact leads to the improvement of the processing speed and the response speed of the cursor.

When the cursor is moved to any windows other than the top window, and the click button is operated, the top window is changed. This feature makes the data processing apparatus easier to operate.

Keyboard controller 21a will now be described. As seen from FIG. 5, keyboard 21 contains function keys 41, normal keys 42, function select key 43, and order select key 44. Normal keys 42 consist of hiragana (Japanese phonetic symbols) keys, alphabet keys and the like. Function select key 43 selects either of function keys 41 or normal keys 42. Order select key 44 selects the order of windows.

Keyboard controller 21a contains a key specifying unit 51. By using the key code input from keyboard 21, this unit specifies function keys 41, function select keys 43, order select key 44, or normal key 42. When key specifying unit 51 specifies the function key by the input key code, the input key code is input to function notifying unit 52. When the key specifying unit 51 specifies the function select key, the input key code is input to function key select unit 53. When the input key code specifies the order select key 44, the input key code is input to order select unit 54. When the key code is for the normal keys 42, it is input to normal key notifying unit 55.

Function notifying unit 52 transfers the input function key code to the task operating in the window having the ownership of the function key.

Function key select unit 53 switches the window having the function ownership from the current window to another window, and notifies the function notifying unit 52 and CRT controller 22a of the window having a new function key ownership. CRT controller 22a controls the CRT display so that the window having the function key is displayed in an intensified manner.

Order select unit 54 is used for selecting a desired order of the window, and notifies normal key notifying unit 55 and CRT controller 22a, of the new top window. CRT controller 22a updates the screen of CRT display 22 according to the signal from order select unit 54.

Normal key notifying unit 55 supplies a normal key code to the task operating in the top window, according to the signal supplied from order select unit 54.

FIGS. 6A and 6B show display examples of CRT display 22, respectively. As shown, windows C and D are displayed overlapping with each other. Function areas C1 and D1 are contained in each of windows C and D. Names of commands, which are executed by each of the function keys are displayed in function areas C1 and D1. For example, when function key 1 is operated in window C, the enlargement of the image being displayed in window C is executed. Intensifying frame F is displayed in the function area of the window currently having the function key ownership. When the operator sees the intensifying frame F, the operator knows what command is to be executed by operating the function key 31 on keyboard 21.

Figure 7:
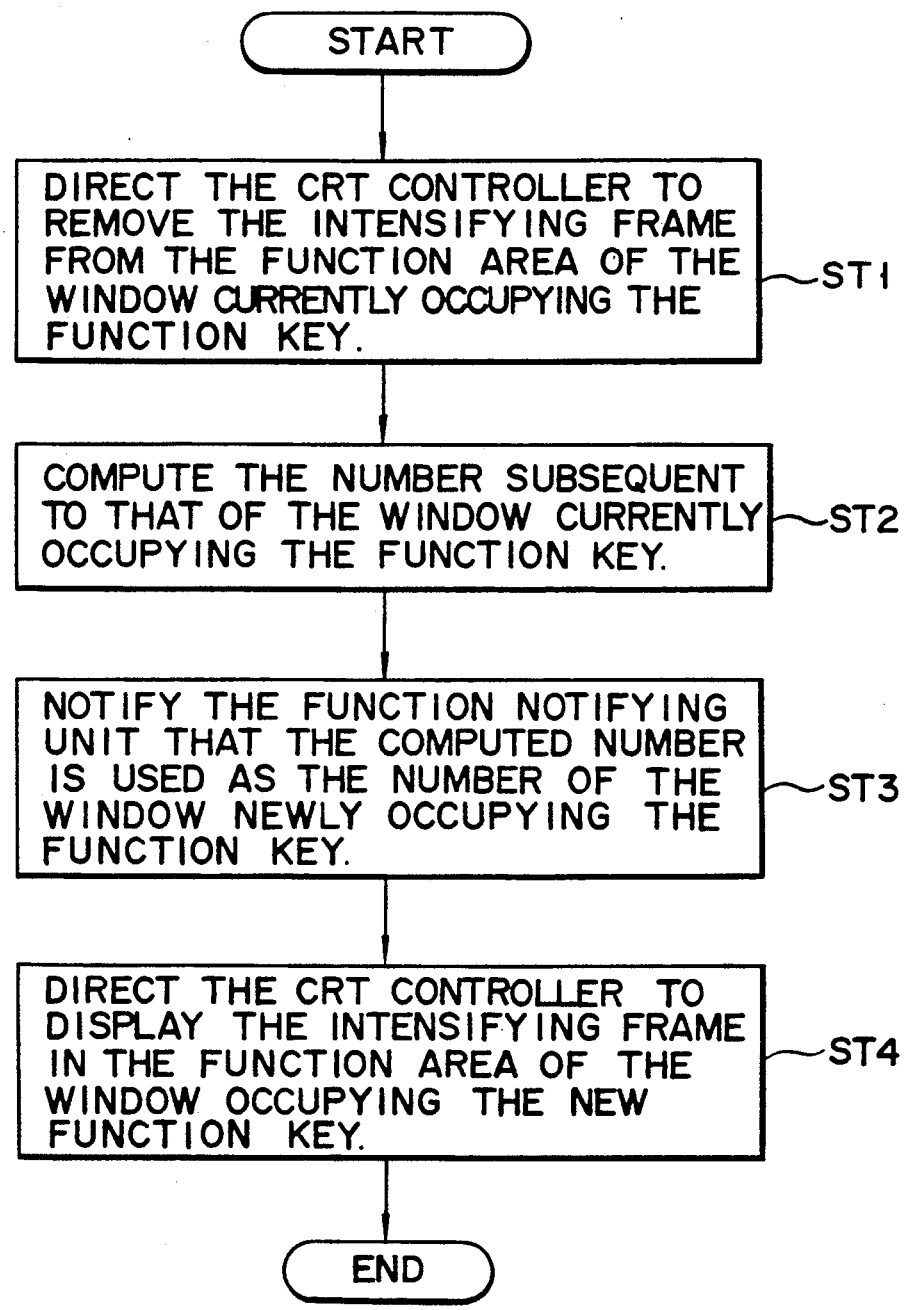
FIG. 7 shows a flow chart further explaining the operation of the circuit of FIG. 5.

FIG. 7 shows a flowchart for explaining the operation of function key select unit 53. Function select key 43 is operated, and a function select key code from key specifying unit 51 is input to function key select unit 53. Upon receipt of this function key code, function key select unit 53 directs CRT controller 22a to remove the function area intensifying frame of the window currently having the ownership of the function key. This is done in step ST1. In step ST2, a window number different from that of the window currently having the function key ownership is computed. Subsequently, in step ST3, the window bearing the computed number is transferred as a new window having the function key ownership, to function key notifying unit 52. In step ST4, control directs CRT controller 22a to display the intensifying frame in the function area of the new window.

FIG. 6A shows the display when the window D has the ownership of the function key. Under this condition, if function select key 43 is input, the intensifying frame is displayed in the function area C1 of window C, as shown in FIG. 6B. The display apparatus is placed in a state that the command in window C can be specified by the function key.

As seen from the foregoing description, when the area detector 31 decides that the indicia is located in the area in the top window as displayed by the display means (CRT 22), the shape setting means (the cursor shape setter 33, for example) changes the shape of the indicia into the shape as set in that window. When the indicia is located in any window other than the top window being displayed, the shape of the indicia is changed into the standard shape. In this way, the indicia can be discriminated for each window. Even if the cursor is moved the operator can smoothly operate the display apparatus without being confused. Furthermore, the response speed of the indicia is improved.

It should be understood that this invention may variously be changed and modified within the scope of the invention.

Figure 8A:
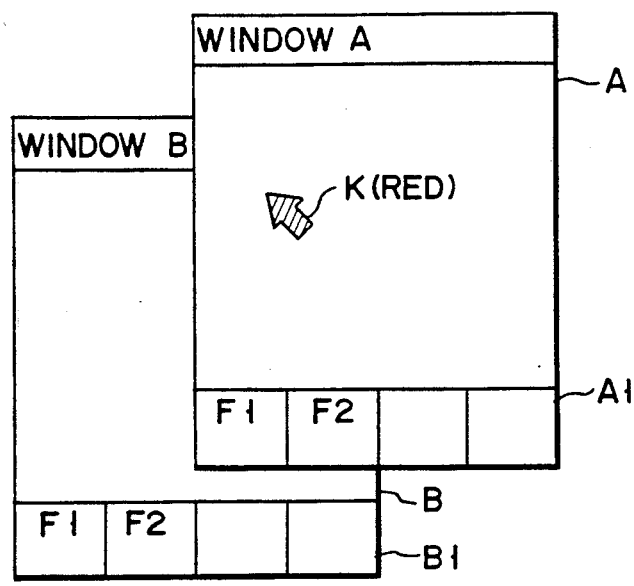
FIGS. 8A to 8C and 9A to 9C show other examples of displays.
Figure 8B:
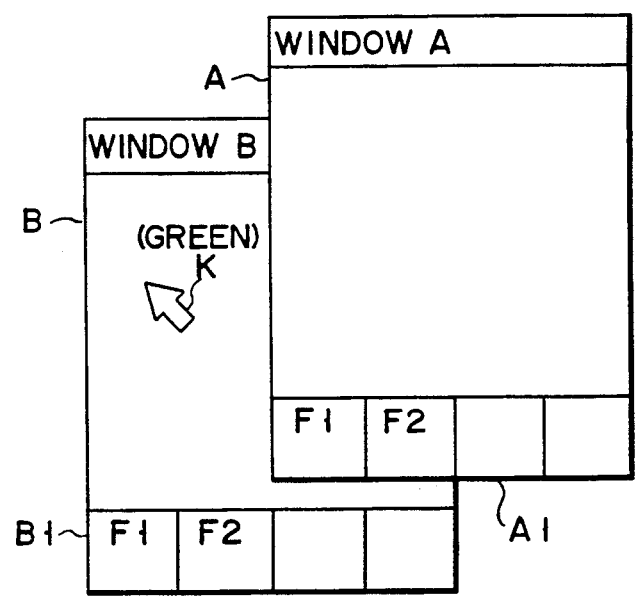
Figure 8C:
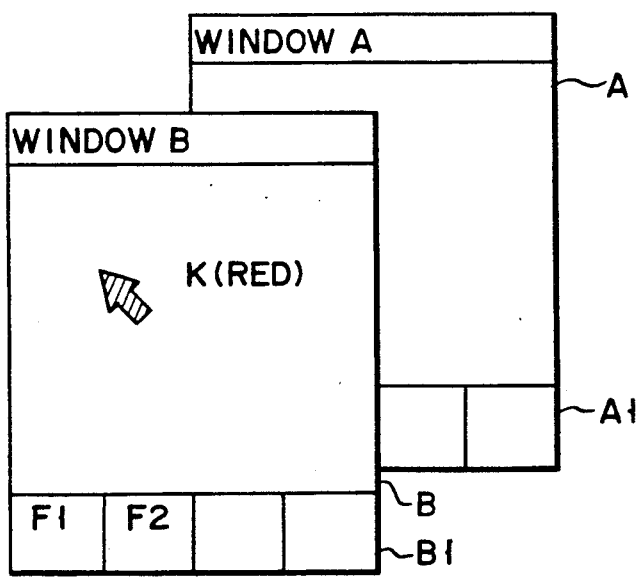
Figure 9A:
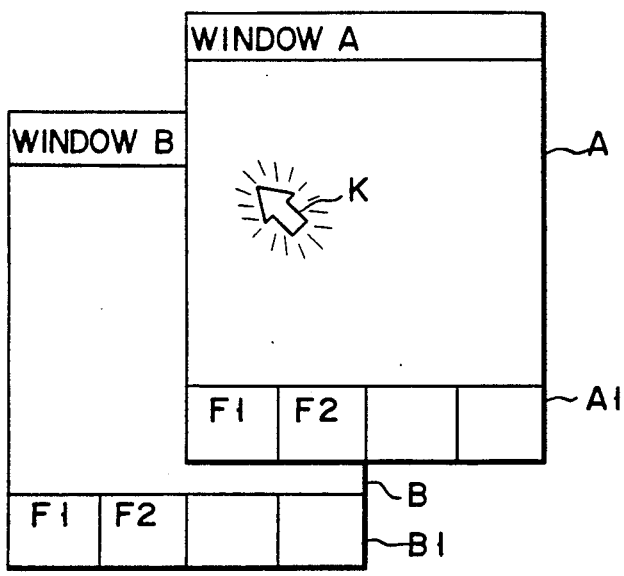
Figure 9B:
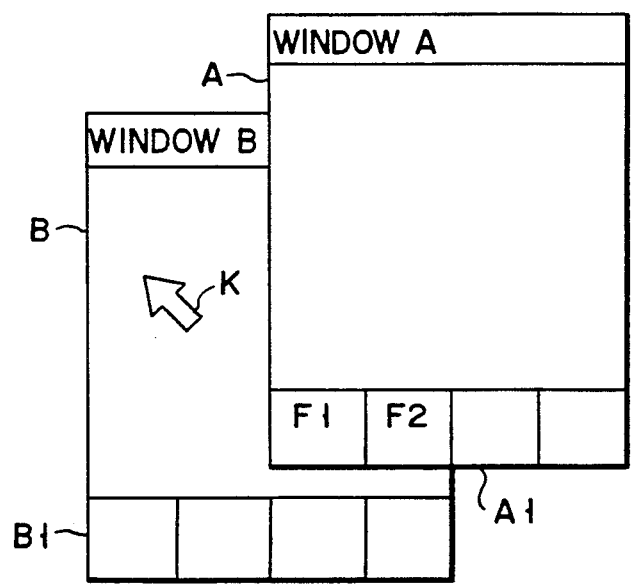
Figure 9C:
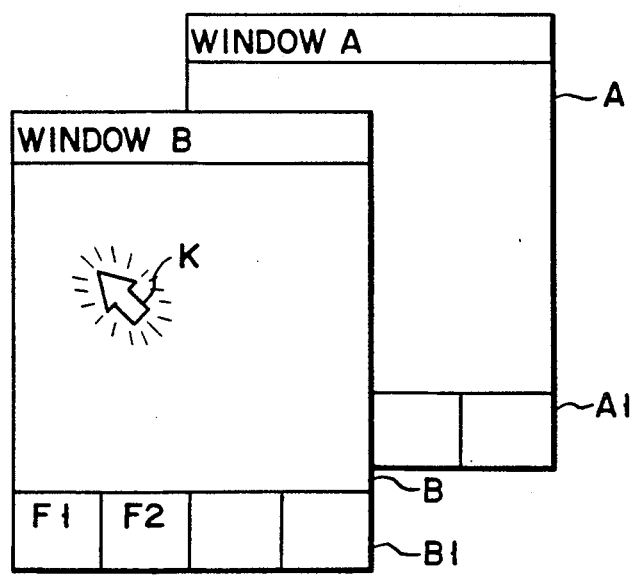

In the above-mentioned embodiment, the shapes of indicias are different, thereby identifying specific windows. Also, the color of the indicia may be changed for the same purpose as shown in FIGS. 8A to 8C. Additionally, the indicia may be intermittently activated in a blinking pattern in at least one window, for example, as shown in FIGS. 9A to 9C. The designer can use any method to distinguish the indicia displayed in the top window from those displayed in other windows while remaining within the scope and spirit of the present invention.

What is claimed is:

1. An information processing apparatus comprising:
    means for displaying a plurality of window areas, each of which includes information to be processed and each of which has an associated one of a plurality of distinguishing indicia, wherein a window area at least partially overlapped and hidden by others of said plurality of windows defines a hidden window area;
    means for determining a window area which is not a hidden window area; and
    means for causing display, in the window area determined not to be hidden window area, of a distinguishing indicia associated with the window area determined not to be a hidden window area.

2. An apparatus according to claim 1, wherein said distinguishing indicia has a predetermined shape.

3. An apparatus according to claim 1, wherein said distinguishing indicia has a predetermined color.

4. An apparatus according to claim 1, wherein said distinguishing indicia has a predetermined blinking state.

5. An apparatus according to claim 1, wherein said distinguishing indicia has a predetermined cursor shape.

6. An information apparatus comprising:
    means for displaying a plurality of window areas, each of which has an associated task, at least two of said plurality of window areas being displayed in an overlapping manner;
    means for determining an uppermost window area and another window area of the plurality of window areas, wherein at least a portion of the other window area is covered by the uppermost window area; and
    means for causing display of a distinguishing indicia in the uppermost window area and for displaying a standard indicia in the other window area.

7. An apparatus according to claim 6, wherein said standard indicia has a different shape from a shape of said distinguishing indicia.

8. An apparatus according to claim 6, wherein said standard indicia has a different color from a color of said distinguishing indicia.

9. An apparatus according to claim 6, wherein said standard indicia has a different blinking state from a blinking state of said distinguishing indicia.

10. An apparatus according to claim 6, wherein said standard indicia has a different cursor shape than a cursor shape of said distinguishing indicia.

11. An information processing apparatus comprising:
    means for displaying a plurality of window areas and an indicia, wherein each of the window areas has an associated task and an associated distinguishing indicia, said displayed indicia being one of the distinguishing indicia, and wherein a window area not overlapped by others of said window areas defines a top window area;
    means for moving the indicia displayed on said display means;
    means for determining the top window area; and
    means for changing said indicia to a distinguishing indicia corresponding to the top window area when said moving means moves the indicia into the top window area.

* * * * *